United States Patent
Matsunaga

[11] Patent Number: 6,087,931
[45] Date of Patent: Jul. 11, 2000

[54] LAMP DRIVING CIRCUIT OF VEHICLE TURN/HAZARD SYSTEM USING DELAYED SWITCHING

[75] Inventor: Mototatsu Matsunaga, Shizuoka, Japan

[73] Assignee: Yazaki Corporation, Tokyo, Japan

[21] Appl. No.: 09/292,851

[22] Filed: Apr. 16, 1999

[30] Foreign Application Priority Data

Apr. 23, 1998 [JP] Japan .................................. 10-113434

[51] Int. Cl.[7] .................................................. B60Q 1/22
[52] U.S. Cl. ........................ 340/463; 340/458; 340/459; 340/464
[58] Field of Search .................................. 340/458, 459, 340/463, 465, 468, 475, 477; 362/487

[56] References Cited

U.S. PATENT DOCUMENTS

| | | | |
|---|---|---|---|
| 5,072,210 | 12/1991 | Kimmelman | 340/458 |
| 5,585,784 | 12/1996 | Pabla et al. | 340/475 |
| 5,677,671 | 10/1997 | Pabla et al. | 340/479 |
| 5,801,623 | 9/1998 | Chen et al. | 340/458 |
| 5,872,511 | 2/1999 | Ohkuma | 340/471 |

FOREIGN PATENT DOCUMENTS 5-50836  7/1993  Japan .

*Primary Examiner*—Jeffery A. Hofsass
*Assistant Examiner*—Phung Nguyen
*Attorney, Agent, or Firm*—Finnegan, Henderson, Farabow, Garrett & Dunner, L.L.P.

[57] ABSTRACT

A lamp driving circuit of a vehicle turn/hazard system blinks a turn hazard lamp 10 by passing a current through a relay contact C of a relay RY intermittently. The relay contact of the relay RY is turned on earlier than a semiconductor switch 20 which is provided between a relay and a battery is, and the former is turned off later than the latter is. During the period while both the relay contact and semiconductor switch are ON, the turn/hazard lamp is illuminated. A first and a second pulse signal are generated to turn on/off the relay contact C and semiconductor device, respectively. The relationship therebetween is changed at regular or random intervals. In this configuration, the lamp driving circuit for a turn hazard system can minimize exhaustion of the relay contact and improve the endurance thereof.

5 Claims, 7 Drawing Sheets

LAMP DRIVING CIRCUIT OF VEHICLE TURN/HAZARD SYSTEM USING DELAYED SWITCHING

BACKGROUND OF THE INVENTION

1. Field of the Invention

The present invention relates to a lamp driving circuit in a vehicle turn/hazard system, and more particularly to a lamp driving circuit in a vehicle turn/hazard system which can recognize the blinking operation of a lamp on the basis of a switching sound of a relay in such a manner that the blinking of the lamp is on/off controlled by the relay.

2. Description of the Related Art

Such a previously known lamp driving circuit is shown in FIG. 8. As seen from FIG. 8, a battery power source Vcc is connected to a turn/hazard lamp 10 through a relay contact C of a relay RY. In operation, as seen from FIG. 9A, after the battery is turned on, when a turn switch 14a or hazard switch 14 connected to a control unit 12 is turned on, the control unit 12 produces a pulse signal having a prescribed period corresponding to the blinking period of the turn/hazard lamp 10.

The pulse signal produced by the control unit 12 is applied to the base of a transistor 16 so that the transistor 16 is turned on/off to energize a relay coil L. Thus, as shown in FIG. 9B, the relay contact C is switched from the off state into the on state, or vice versa. A current is supplied intermittently from the battery to the turn/hazard lamp 10 so that the lamp 10 blinks. Incidentally, the relay RY is used in the lamp driving circuit so that the blinking operation of the lamp 10 can be recognized by the switching sound of the relay.

In the configuration described above, as seen from FIGS. 9B and 9C, at timings t1 and t3, the relay contact C turns on and hence the turn/hazard lamp 10 also turns on. At this time, as seen from FIG. 9D, a large rushing current is passed through the turn/hazard lamp 10. This rushing current is also supplied to the relay contact C. However, at the timing when the rushing current has been supplied to the relay contact C, the relay contact is not still in the stable conducting state. Further, at timings t2 and t4, when the relay contact C turns off and hence the turn hazard lamp 10 turns off, an arc is generated at the contact because the voltage has been applied to the contact C from the battery.

If the large rushing current flows through the relay contact C which is not in the stable conducting state, the arc occurs at the relay contact C, the relay contact C is exhausted. The repetition of such a phenomenon for a long time leads to the faulty contact of the relay contact. As a result, the lamp does not operate normally. However, in the turn/hazard system, the relay contact is switched with a high frequency. Therefore, the relay is required to have high endurance to its repetitive switching. In order to satisfy such a requirement, a system can be proposed which uses a high-class expensive relay or can easily replace the broken relay by a new one. However, this leads to high production cost of the system.

SUMMARY OF THE INVENTION

An object of the present invention is to provide a lamp driving circuit in a vehicle turn/hazard system which can minimize the exhaustion of a relay contact to improve its endurance.

In order to attain the above object, in accordance with the present invention, there is provided a lamp driving circuit for driving a turn/hazard lamp in a turn/hazard system comprising: a power supply source; a relay having a relay contact provided between the power supply source and the turn/hazard lamp, through which a current is intermittently passed to blink the turn/hazard lamp; a semiconductor switching means provided between said relay and the power supply source, and control means for ON/OFF controlling the relay and the semiconductor switching means so that the relay contact is turned on earlier than the semiconductor switching means and the former is turned off later than the latter is, and during the period while both the relay contact and semiconductor switch are ON, the turn/hazard lamp is illuminated.

In this configuration, the relay contact and the semiconductor switch are so controlled that the former is turned on earlier than the latter and the former is turned off later than the latter is. Therefore, no voltage is applied to the relay contact when it turns on or off. Thus, the rushing current when the turn hazard lamp turns on does not flow through the relay contact when it turns on. Further, at the timing when the relay contact turns off, no arc is generated between the contact points. In this way, exhaustion of the relay contact can be minimized to improve the endurance of the lamp driving circuit.

Preferably, the control means comprises: a pulse signal generating means for synchronously generating a first pulse signal to turn on said relay contact intermittently and a second pulse signal to turn on the semiconductor switching means intermittently; a first driving means for driving said relay contact on the basis of the first pulse signal; a second driving means for driving the semiconductor switching means on the basis of the second pulse signal. The first pulse signal has a longer pulse width than that of the second pulse signal, and the former is generated earlier than the latter and continues to exceed the pulse width of the second pulse signal.

Preferably, the pulse signal generating means comprises means for modifying the first pulse signal or second signal at regular intervals or random intervals so that the first pulse signal has a longer pulse width than that of the second pulse signal, and the former is generated earlier than the latter and continues to exceed the pulse width of the second pulse signal.

In this configuration, at regular intervals or random intervals, the first pulse signal or second pulse signal is modified. Correspondingly, at regular intervals or random intervals, the rushing current when the turn hazard lamp turns on flows through the relay contact when it turns on, otherwise at the timing when the relay contact turns off, an arc is generated between the contact points. In this way, the foreign substance invading the relay contact and oxide film formed there can be blown off. Thus, without great exhaustion of the relay contact, the relay contact can be kept in a good conducting state.

Preferably, said turn/hazard lamp includes a left turn/hazard lamp and a right turn/hazard lamp provided on both left and side sides of a vehicle body; said relay includes a left side relay for the left turn/hazard lamp and a right side relay for the right side turn/hazard lamp ; said control means includes a turn switch and hazard lamp switch; said semiconductor switch means is provided commonly for said left side relay and said right side relay; said first driving means includes a first left side driving means and a first right side driving means which correspond to the left side relay and the right side relay, respectively. The pulse signal generating means generates the first pulse signal and the second pulse signal in response to turn-on of the turn switch or the hazard switch, and in response to the first pulse signal, in accordance with an operation direction of the turn switch, the first left driving means or the right driving means turns on the left side relay or the right side relay.

In this configuration, the left and right turn/hazard lamps can be blinked in accordance with the operation of the turn switch or hazard switch, and the relay contact is not exhausted or fallen in the poor conducting state during their operation.

The above and other objects and features of the present invention will be more apparent from the following description taken in conjunction with the accompanying drawings.

DESCRIPTION OF THE PREFERRED EMBODIMENTS

Figures 2, 3A, 3B, 3C, 3D, 3E:
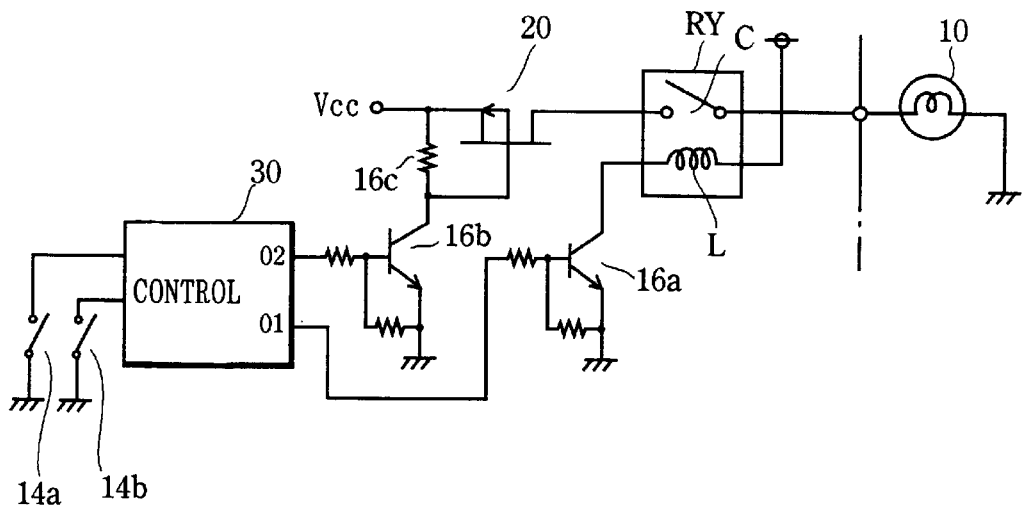
FIG. 2 is a circuit diagram of one embodiment of a lamp driving circuit of the turn/hazard system according to the present invention.
FIGS. 3A–3E are timing charts each showing the operation states of the individual sections in FIG. 2.
Figure 8:
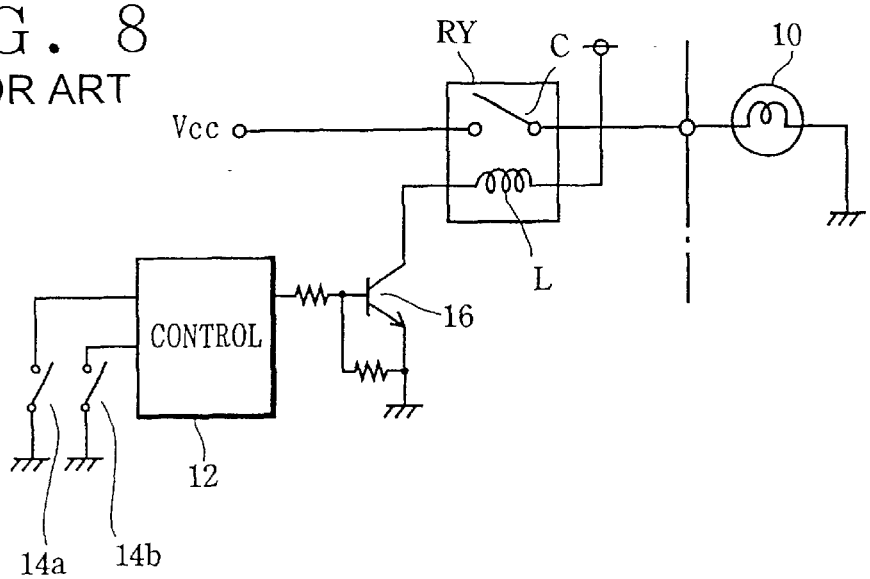
FIG. 8 is a circuit diagram showing an example of a lamp driving circuit according to a conventional turn/hazard system.
Figure 9A:
FIGS. 9A–9D are timing charts each showing the states of the individual sections in FIG. 8.
Figure 9B:
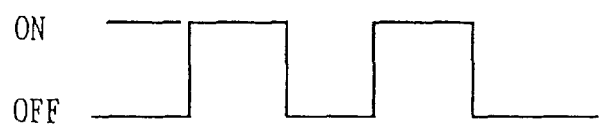
Figure 9C:
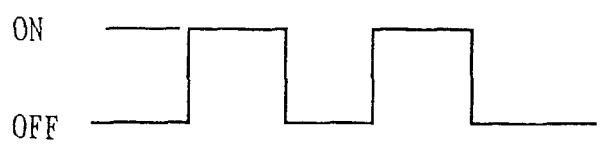
Figure 9D:
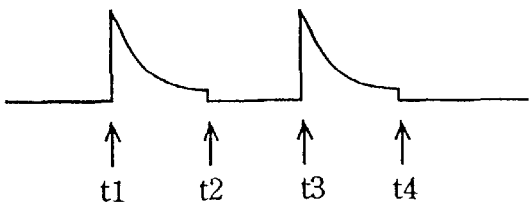

Now referring to the drawings, an explanation will be given of embodiments of the present invention. FIG. 2 is an embodiment of a lamp driving circuit of a turn/hazard lamp system according to the present invention. In the respective drawings, like reference numerals refer to like parts in FIG. 8 showing the prior art.

As seen from FIG. 2, a field effect transistor (FET) 20 serving as a semiconductor switch is connected between a battery power source (power supply source) mounted in a vehicle and a relay RY. When both the FET 20 and the relay contact of a relay Ry turn on, because of power supply from the battery, a turn/hazard lamp 10 turns on or illuminates.

The one end of a relay coil L is connected to a power supply and the other end thereof is connected to ground through an NPN switching transistor 16a for control. When the switching transistor 16a is turned on, the relay L is energized. At this time, the relay contact C is turned from "OFF" to "ON". The control gate of the FET 20 is connected to ground through an NPN switching transistor 16b. When the switching transistor 16b turns on, since the gate potential of the FET 20, which has been maintained at the battery potential through a resistor 16c, is substantially lowered to the ground, the FET 20 turns on.

A turn switch 14a and hazard switch 14b are connected to a control unit 30. The outputs 01 and 02 from the control unit 30 are connected to the bases of the switching transistors 16a and 16b, respectively. The control unit 30 is constructed of a microcomputer ($\mu$COM) which includes a central processing unit (CPU) which is operated in accordance with a prescribed program, a read-only-memory (ROM) which stores several kinds of programs and fixed data, and read/write memory (RAM) which has an areas for data processing and data storage.

When the turn-on switch 14a or hazard switch 14b is turned on, in accordance with the prescribed program by the CPU, the control unit 30 produces, at the outputs 01 and 02, pulse signals at prescribed periods corresponding to the blinking period of the turn/hazard lamp 15. The pulse signals are supplied to the bases of the control switching transistors 16a and 16c, respectively. While the pulse signals are "H", the transistors 16a and 16b are "ON". The pulse signal produced at the output 01 of the control unit 30 has a longer "H" level period than that produced at the output 02. In addition, the rise of the former precedes that of the latter, and the fall of the former gets behind that of the latter. The control unit 30 and the switching transistors 16a, 16b constitute a control means 300 for controlling the relay RY and the FET 20. The control unit 30 serves as a pulse generating means 30a having a program changing means 30a1.

An explanation will be given of the operation of the lamp generating means described above.

As seen from FIG. 3A, after the battery power source is turned on, when the turn switch 14a or hazard switch 14b is turned on, the control unit 30 produces, at the outputs 01 and 02, first and second pulse signals at prescribed periods corresponding to the blinking period of the turn/hazard lamp 15, respectively. The first pulse signal produced at the output 01 is applied to the base of the switching transistor 16a. While the first pulse signal is "H", the switching transistor 16a is "ON". On the other hand, while the first pulse signal is "L", the switching transistor 16a is "OFF". When the switching transistor 16a is turned on/off, the relay coil L is energized intermittently. Thus, as seen from FIG. 3B, the relay contact C is switched from "OFF" to "ON" or vice versa.

The second pulse signal produced at the output 02 is applied to the base of the switching transistor 16b. While the second pulse signal is "H", the switching transistor 16a is "ON". On the other hand, while the second pulse signal is "L", the switching transistor 16b is "OFF". When the switching transistor 16b is turned on/off, the FET 20 is energized intermittently. Thus, as seen from FIG. 3C, the FET 20 is switched from "OFF" to "ON" or vice versa.

As described above, as seen from FIGS. 3B and 3C, when both the relay contact C and FET 20 are "ON", a current flows from the battery power source to the turn/hazard lamp 10. While the current flows, the turn/hazard lamp 10 illuminates.

At the instant when the FET 20 turns on and the large rushing current flows to the turn/hazard lamp 10 so that the turn/hazard lamp 10 illuminates, the relay contact C has been precedently turned on (t11,t13), and in the stable "ON" state. Therefore, when the FET 20 turns on, even if the large rushing current flows through the relay contact C, the relay contact C is not be exhausted. Further, at the instant when the FET 20 turns off and the turn/hazard lamp 10 turns off, the relay contact C is still "ON". At the timing (t12 or t14) when the relay contact C actually turns off, a voltage from the battery is not applied to the relay contact C so that the current does not flow therethrough. Therefore, no arc occurs there and hence the relay contact C is not exhausted owing to the arc.

In this way, even if the turn/hazard lamp 10 is blinked repeatedly for a long time, faulty contact due to the exhaustion of the contact does not occur so that the lamp operates normally. Therefore, it is not required to use a high-class and expensive relay having endurance to the number of times of switching and to adopt a system in which the faulty contact is easily replaced by a new good relay product. This contributes to cost reduction of the vehicle turn/hazard system.

Referring to the flowchart of FIG. 4, a detailed explanation will be given of the operation of the control unit 30 which is carried out in accordance with the prescribed program by the CPU of the μCOM serving as the control unit 30.

When the power supply source is turned on, the CPU starts to operate. In initial step S1, it is determined if the turn switch 16a or hazard switch 16b is "ON". If NO, the "ON" of either switch is awaited. If YES, in step S2, a timer X located in a predetermined area in the RAM is started, and the output 01 is raised to "H" (which corresponds to "ON" of the relay contact RY). In step S3, it is determined whether or not time T1 has elapsed. If NO, the elapse of the time T1 is awaited. If YES, in step S4, the output 02 is raised to "H" (which corresponds to "ON" of the FET 20).

In step S5, it is determined whether time T2 has elapsed. If NO, the elapse of the time T2 is awaited. If YES, in step S6, the output 01 is lowered to "L" (which corresponds to "DOFF" of the relay contact C of the relay RY). In step S7, it is determined whether or not time T3 has elapsed. If NO, the elapse of the time T3 is awaited. If YES, in step S8, the output 02 is lowered to "L" (which corresponds to "OFF" of the FET 20).

In step S9, it is determined whether or not time T4 (the off period of the FET 20) has elapsed. If NO, the elapse of the time T4 is awaited. If YES, the program returns to step S1 in order to determine that the turn switch 16a or hazard switch 16 has turned on. If the turn switch 16a or hazard switch 16b is still "ON", the processing of steps S2–S9 is repeated. Thus, until the turn switch 16a or hazard switch 16b is turned off so that step Si is determined NO, the CPU of the control unit 30 continues to generate the first and the second pulse signal in a prescribed relationship therebetween at the outputs 01 and 02.

Figure 4:
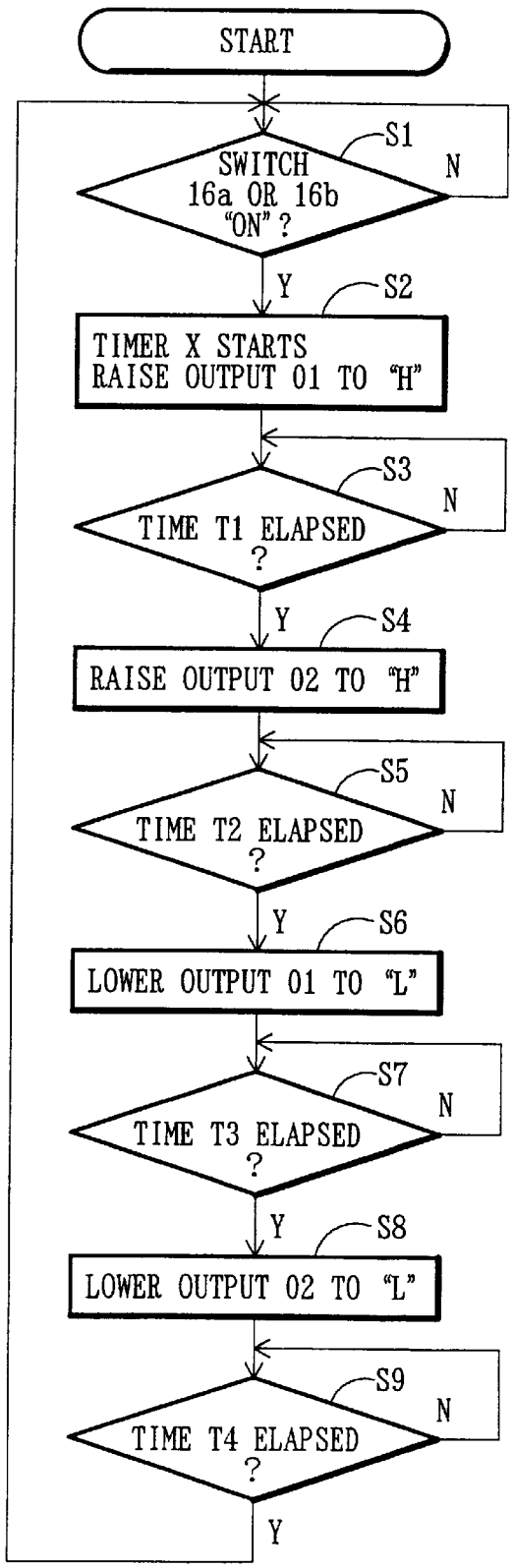
FIG. 4 is a flowchart of the processing which is carried out by a CPU of the control unit in FIG. 2.

As seen from the description of the flowchart of FIG. 4, the CPU of the control unit 30 serves as a pulse signal generating means 30a which synchronously generates the first pulse signal and the second pulse signal. The first pulse signal serves to turn on the relay contact C of the relay RY intermittently, whereas the second pulse signal serves to turn on the FET (semiconductor switching means) 20.

In the turn/hazard lamp driving circuit of FIG. 2, only one turn/hazard lamp is shown. However, in a practical use, a total of six turn/hazard lamps are actually installed on the left and right sides of the front, intermediate and rear positions of a vehicle. At the time of occurrence of hazard, all the six turn/hazard lamps must be blinked. At the time of turn, in accordance with the direction of turn, the three lamps on the left side or the three lamps on the right side must be blinked individually.

Figure 5:
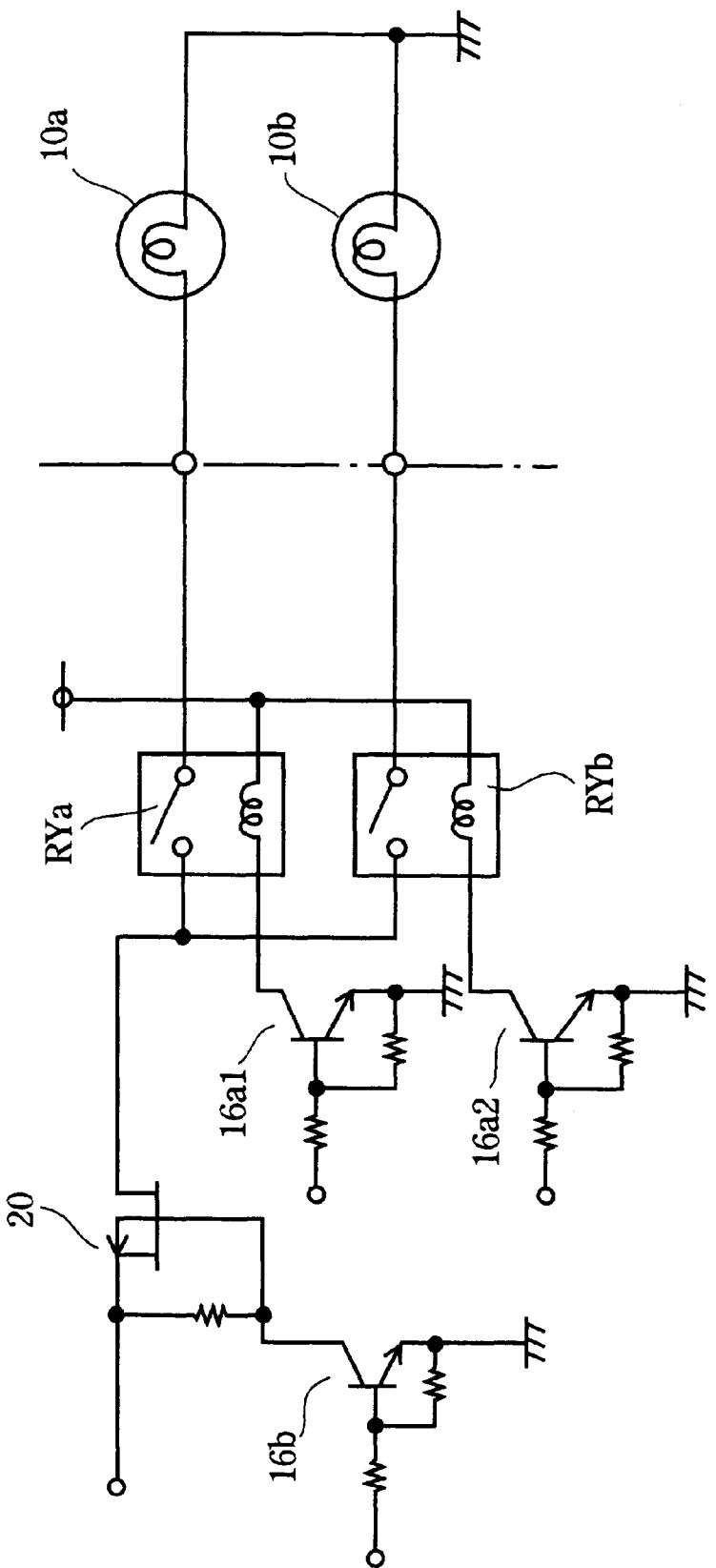
FIG. 5 is a circuit diagram of another embodiment of a lamp driving circuit in the turn/hazard system according to the present invention.
Figure 6:
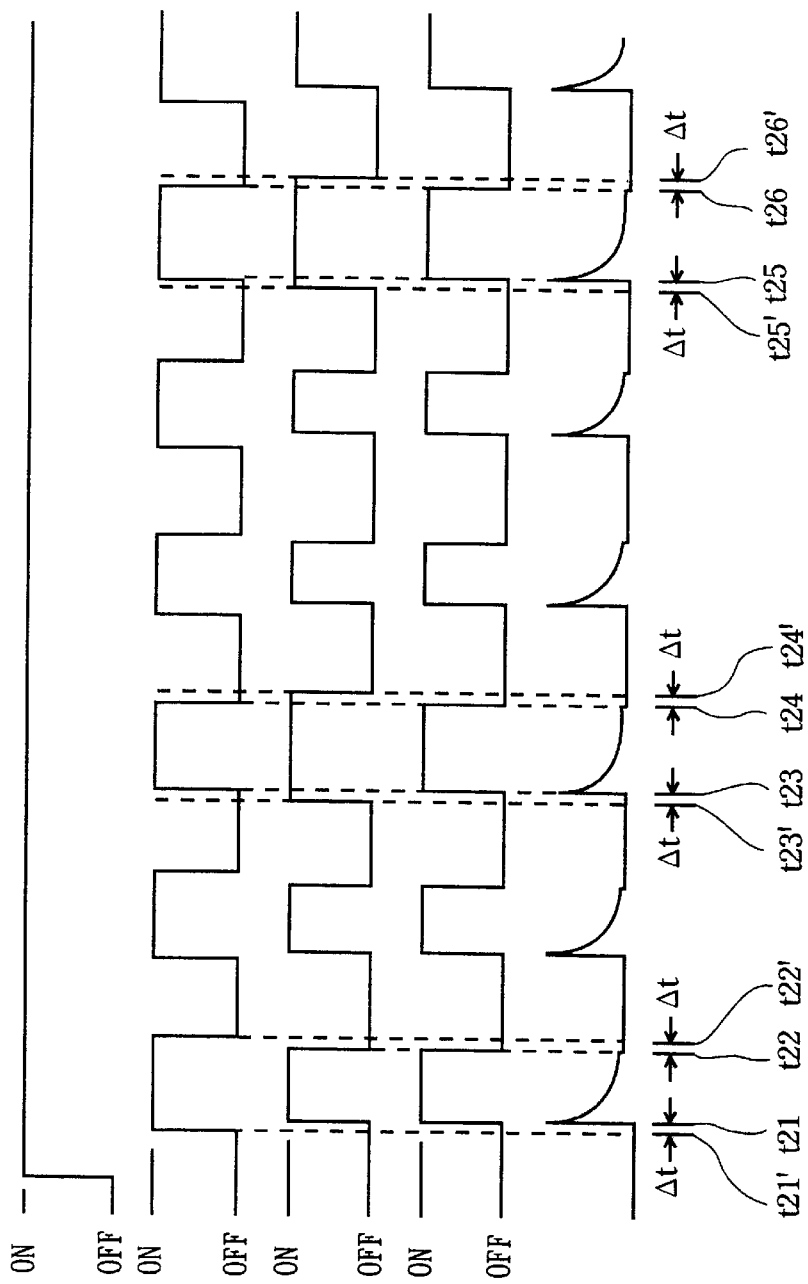
FIGS. 6A–6E are timing charts each showing the operation states of the individual sections in a modification of the lamp driving circuit in the turn/hazard system according to the present invention.

To this end, as shown in FIG. 5, relays Rya and Ryb are individually inserted between the FET 20 and a turn/hazard lamp 10a on the left side and a turn/hazard lamp 10b on the right side, respectively. Switching transistors 16a1 and 16a2 are individually provided which turn on/off the relays Rya and Ryb, respectively. At the time of turn, the pulse signal is applied to only one of these switching transistors 16a and 16b to turn on/off only one of the relays Rya and Ryb. At the time of hazard, the pulse signals are applied to both switching transistors 16a and 16b to turn on/off both relays Rya and Ryb.

Although the control unit 30 is not shown in FIG. 5, in this embodiment, it must carry out the selection control of applying the first pulse signal from the output 01 to the base of one of the switching transistors 16a1 and 16a2 in accordance with the operation direction of the turn switch 14a.

Incidentally, the relay is liable to suffer from foreign particles during its manufacturing process. Specifically, the foreign particles may be deposited on the relay contact C, and an oxide film may be formed on the contact. Owing to such a phenomenon, even if the relay contact turns on, a current may not flow. Meanwhile, the exhaustion of the relay contact which was problematic as described above served to blow off the foreign particles and the oxide film so that faulty conduction does not occur. However, in this embodiment, which intends to prevent the relay contact from being exhausted owing to its repeated on/off, the above foreign material and the oxide film cannot be blown off. Therefore, possible faulty contact cannot be canceled.

An operation for overcoming such an inconvenience will be explained using the timing charts of FIGS. 6A–6E. For example, in a period of timing t21–timing t22, the turn/hazard lamp 10 operates in the same manner as in the embodiment described above. Specifically, at the timing t21 when the FET 20 turns on and the turn/hazard lamp turns on, the relay contact C has been already turned on at the timing t21' precedent from the timing t21 by Δt. Further, at the timing t22 when the FET 20 turns off and the turn/hazard lamp 10 turns off, the relay contact C is still "ON". At the timing t22' when the relay contact C actually turns off later by Δ t from the timing t22, no voltage is applied to the relay contact C and no current flows.

On the other hand, at the periods of timing t23–timing t24 and timing t25–timing t26, the turn/hazard lamp 10 operates in the different manner from the above embodiment. At the timings t23' and t25', the FET 20 turns on. Therefore, the timings t23 and t25 when the relay contact C turns on, the FET 20 has already turned on. Namely, the relay contact C turns on later from the FET 20 by Δt. At the timings t23 and t25 when the relay contact C turns on and a large rushing current flows through the turn/hazard lamp 10, the relay contact is not still stable. In this state, the rushing current flows through the relay contact C to blow off the foreign substance or oxide film on the relay contact C. Further, the timings t24 and t26 when the relay contact C turns off, the FET 20 still "ON" so that the voltage is still applied to the relay contact C. Therefore, at the instant when the relay contact turns off, an arc is generated at the relay contact C. The arc blows off the foreign substance and oxide film existing thereon.

The period of t23'–t24' or t25'–t26' is inserted at regular intervals or random intervals between the normal periods of t21–t22 at the frequency when a portion of the relay contact itself is not blown off together the foreign substance or oxide film. Thus, the rushing current when the relay contact C turns on and/or the arc when the relay contact C turns off prevents the relay contact C from being exhausted frequently and at the same time blows off the foreign substance or oxide film on the relay contact at a suitable frequency so that possible faulty contact can be canceled.

Now referring to FIG. 7, a detailed explanation will be given of the processing to be carried out by the CPU in the control unit 30 performing the operation shown in FIG. 6A–6E.

Where the period of t23–t24 or t25–t26 is inserted at regular intervals between the normal period t21–t22, the CPU performs entirely the same processing as in steps S1–S9 in FIG. 4. However, in step S9, if the answer is YES, the program does not return to step S1 but proceeds to step S10. In step S10, the counter Y located in a prescribed area of RAM in the control unit 30 is incremented. In step S11, it is determined whether or not the value of the counter Y is equal to a prescribed value A. If NO, the program returns to step S1. If YES, the program proceeds to step S12. In step S12, the value of the counter is cleared, the timer Z located in another prescribed area of the RAM of the control unit 30 is started, and the output 02 is raised to "H" level (which corresponds to "ON" of the FET 20).

In step S13, it is determined whether time T11 has elapsed. If NO, the elapse of the time T11 is awaited. If YES, in step S14, the output 01 is raised to "H" (which corresponds to "ON" of the relay contact C of the relay RY).

In step S15, it is determined whether or not time T12 has elapsed. If NO, the elapse of the time T12 is awaited. If YES, in step S16, the output 02 is lowered to "L" (which corresponds to "OFF" of the FET 20). In step S17, it is determined whether time T13 has elapsed. If NO, the elapse of the time T13 is awaited. If YES, in step S18, the output 01 is lowered to "L" (which corresponds to "OFF" of the relay contact C of the relay RY).

In step S19, it is determined whether or not time T14 has elapsed. If No, the elapse of the time T14 is awaited. If YES, the program returns to step S1 in order to determine that the turn switch 16a or hazard switch 16 has turned on. If the turn switch 16a or hazard switch 16b is still "ON", the processing of steps S2–S10 is repeated. Thus, until the turn switch 16a or hazard switch 16b is turned off so that step S1 is determined NO, the CPU of the control unit 30 continues to generate the first and the second pulse signal in a prescribed relationship therebetween and also in a varied relationship at regular intervals at the outputs 01 and 02.

Where the period of t23–t24 or t25–t26 is inserted at random intervals, with a random numerical value "A" selected within a prescribed range in step S1, the determination in step S11 may be made. By modifying the flowchart of FIG. 7, the period of t23–t24 or t25–t26 can be inserted.

In the embodiments described above, at both the timings when the relay contact C turns on and off, the foreign substance or oxide film was blown off. It may be blown off at the one of the timings of turn-off and turn-on. This can be carried out in such a manner that both timings when the FET 20 turns on and off are made earlier or later than those when the relay contact C turns on and off.

Figure 1:
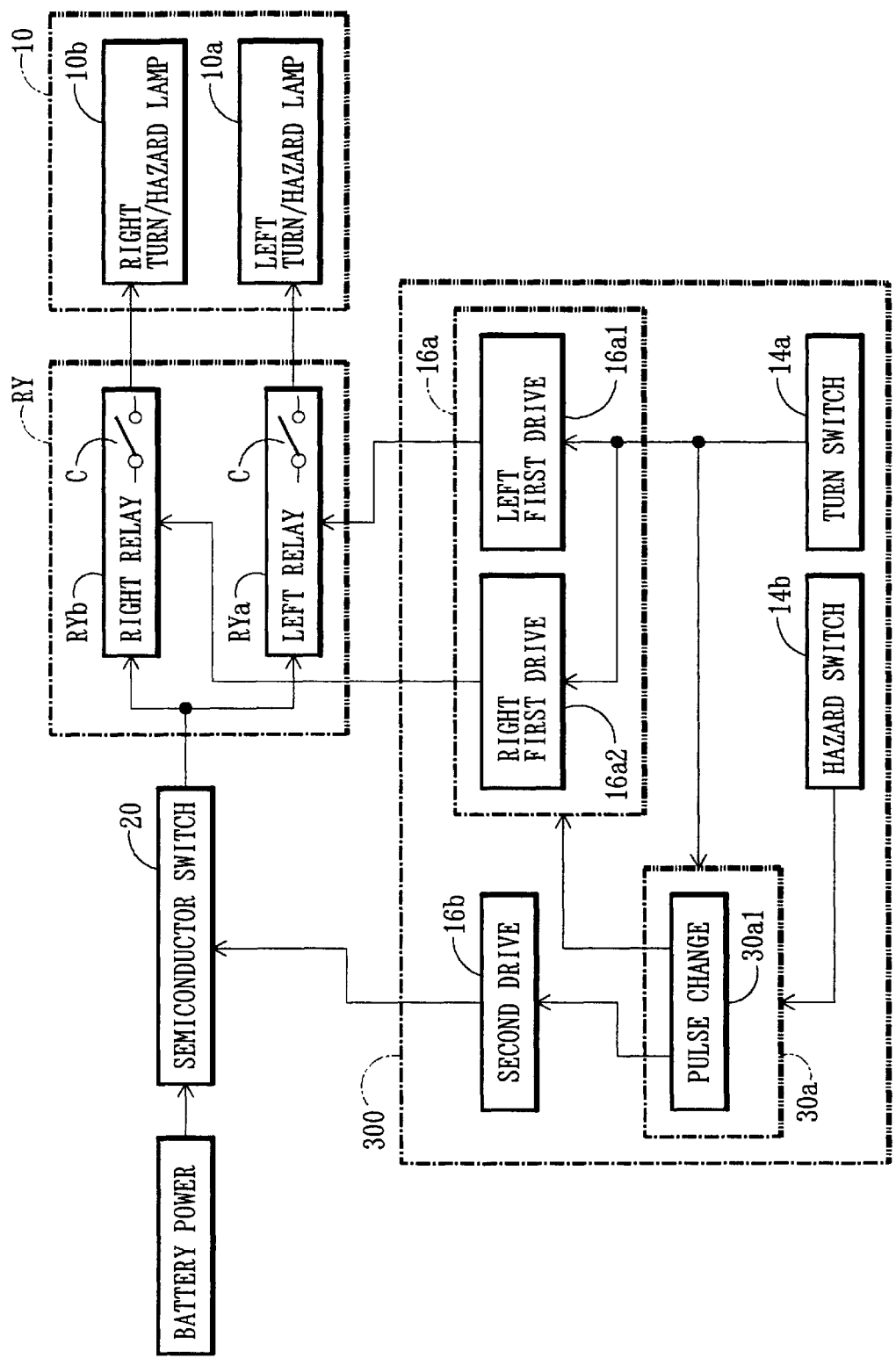
FIG. 1 is a block diagram of the basic configuration of a lamp driving circuit in a turn/hazard system according to the present invention.
Figure 7:
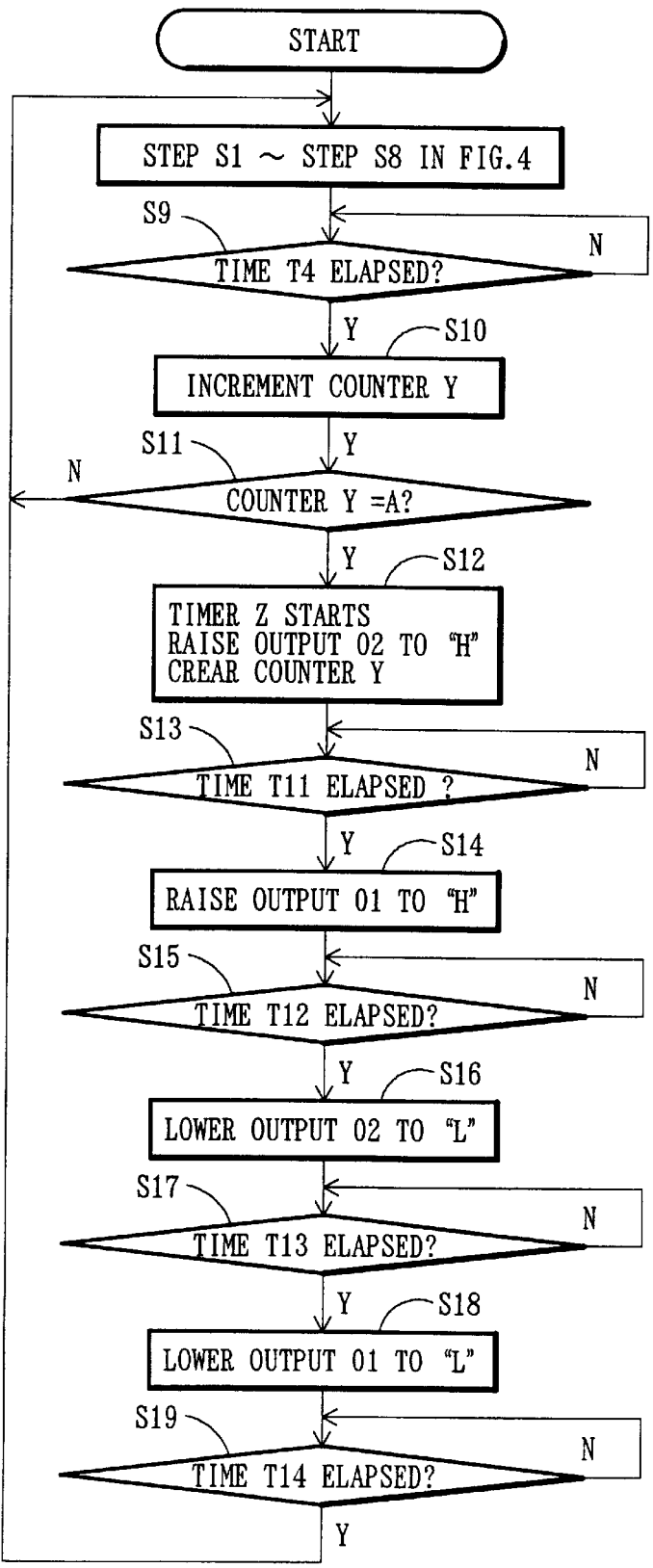
FIG. 7 is a flowchart showing the processing which is carried out by CPU in the control unit in FIG. 2 in order to realize the operation shown in FIGS. 6A–6E.

As apparent from the explanation referring to the flowchart of FIG. 7, the CPU in the control unit 30 serves as the pulse signal changing means 30a1 in FIG. 1. Namely, it changes the first pulse signal or second pulse signal so that at regular or random intervals, the pulse width of the second pulse signal is made longer than that of the first pulse signal, and the second pulse signal is generated precedently to the first pulse signal or continues to exceed the pulse width of the first pulse signal.

What is claimed is:

1. A lamp driving circuit for driving a turn/hazard lamp in a turn/hazard system comprising:

a power supply source;

a relay having a relay contact provided between the battery and the turn/hazard lamp, through which a current is intermittently passed to blink the turn/hazard lamp;

a semiconductor switching means provided between said relay and said power supply source, and control means for ON/OFF controlling said relay and said semiconductor switching means so that the relay contact is turned on earlier than said semiconductor switching means and the former is turned off later than the latter is, and during the period while both the relay contact and semiconductor switch are ON, the turn/hazard lamp is illuminated.

2. A lamp driving circuit for driving a turn/hazard lamp in a turn/hazard system according to claim 1 wherein said control means comprises:

a pulse signal generating means for synchronously generating a first pulse signal to turn on said relay contact intermittently and a second pulse signal to turn on said semiconductor switching means intermittently;

a first driving means for driving said relay contact on the basis of the first pulse signal;

a second driving means for driving said semiconductor switching means on the basis of the second pulse signal;

wherein said first pulse signal has a longer pulse width than that of said second pulse signal, and the former is generated earlier than the latter and continues to exceed the pulse width of said second pulse signal.

3. A lamp driving circuit for driving a turn/hazard lamp in a turn/hazard system according to claim 2, wherein said pulse signal generating means comprises means for modifying said first pulse signal or second pulse signal so that said first pulse signal has a longer pulse width than that of said second pulse signal, and the former is generated earlier than the latter and continues to exceed the pulse width of said second pulse signal.

4. A lamp driving circuit for driving a turn/hazard lamp in a turn/hazard system according to claim 2, wherein said turn/hazard lamp includes a left turn/hazard lamp and a right turn/hazard lamp provided on both left and side sides of a vehicle body;

said relay includes a left side relay for the left turn/hazard lamp and a right side relay for the right side turn/hazard lamp;

said control means includes a turn switch and hazard lamp switch;

said semiconductor switch means is provided commonly provided for said left side relay and said right side relay;

said first driving means includes a first left side driving means and a first right side driving means which correspond to the left side relay and the right side relay, respectively, wherein said pulse signal generating means generates the first pulse signal and the second pulse signal in response to turn-on of said turn switch or said hazard switch, and in response to the first pulse signal, in accordance with an operation direction of the turn switch, the first left driving means or said right driving means turns on the left side relay or said right side relay.

5. A lamp driving circuit for driving a turn/hazard lamp in a turn/hazard system according to claim 3, wherein said turn/hazard lamp includes a left turn /hazard lamp and a right turn/hazard lamp provided on both left and side sides of a vehicle body;

said relay includes a left side relay for the left side turn/hazard lamp and a right side relay for the right side turn/hazard lamp;

said control means includes a turn switch and hazard lamp switch;

said semiconductor switch means is provided commonly provided for said left side relay and said right side relay;

said first driving means includes a first left side driving means and a first right side driving means which correspond to the left side relay and the right side relay, respectively, wherein said pulse signal generating means generates the first pulse signal and the second pulse signal in response to turn-on of said turn switch or said hazard switch, and in response to the first pulse signal, in accordance with an operation direction of the turn switch, the first left driving means or said right driving means turns on the left side relay or said right side relay.

* * * * *